US005772112A

United States Patent [19]

Bulcroft

[11] Patent Number: 5,772,112

[45] Date of Patent: Jun. 30, 1998

[54] RECYCLING DEVICE

[76] Inventor: Ronald R. Bulcroft, 4041 Lydgate Dr., North Olmstead, Ohio 44070

[21] Appl. No.: 645,529

[22] Filed: May 14, 1996

[51] Int. Cl.[6] .................... B65G 11/04

[52] U.S. Cl. .................... 232/44

[58] Field of Search .................... 232/44, 43.1, 43.2

[56] References Cited

U.S. PATENT DOCUMENTS

| | | | |
|---|---|---|---|
| 2,792,171 | 5/1957 | Rossey | 232/44 X |
| 3,261,441 | 7/1966 | Mullens | 232/43.2 X |
| 3,554,345 | 1/1971 | Mullens | 232/44 |
| 4,013,215 | 3/1977 | Mercier | 232/44 X |
| 4,079,548 | 3/1978 | Zaccaria | 232/44 X |
| 5,007,581 | 4/1991 | Douglas | 232/44 X |
| 5,145,217 | 9/1992 | Anderson et al. | 285/179 |

*Primary Examiner*—Jerry Redman

*Attorney, Agent, or Firm*—Michael I. Kroll

[57] ABSTRACT

A recycling device (10) comprising a chute (12). A structure (14) is for mounting an upper end of the chute (12) through an exterior wall (16) of a building (18), so that the chute (12) will extend at an angle down and away from the exterior wall (16). A container (20) having an open top is provided. The container (20) is located on the ground (22) under a lower end of the chute (12) outside the exterior wall (16) of the building (18). A lid (24) is on the open top of the container (20). A collar (26) extends up from the center of the lid (24). A flexible coupling member (28) is attached between the lower end of the chute (12) and the collar (26). The container (20) can receive useful recyclable materials that are inserted into the chute (12) from within the building (18). The flexible coupling member (28) will allow the lid (24) to be lifted off of the open top of the container (20), when the useful recyclable materials fill up the container (20).

15 Claims, 3 Drawing Sheets

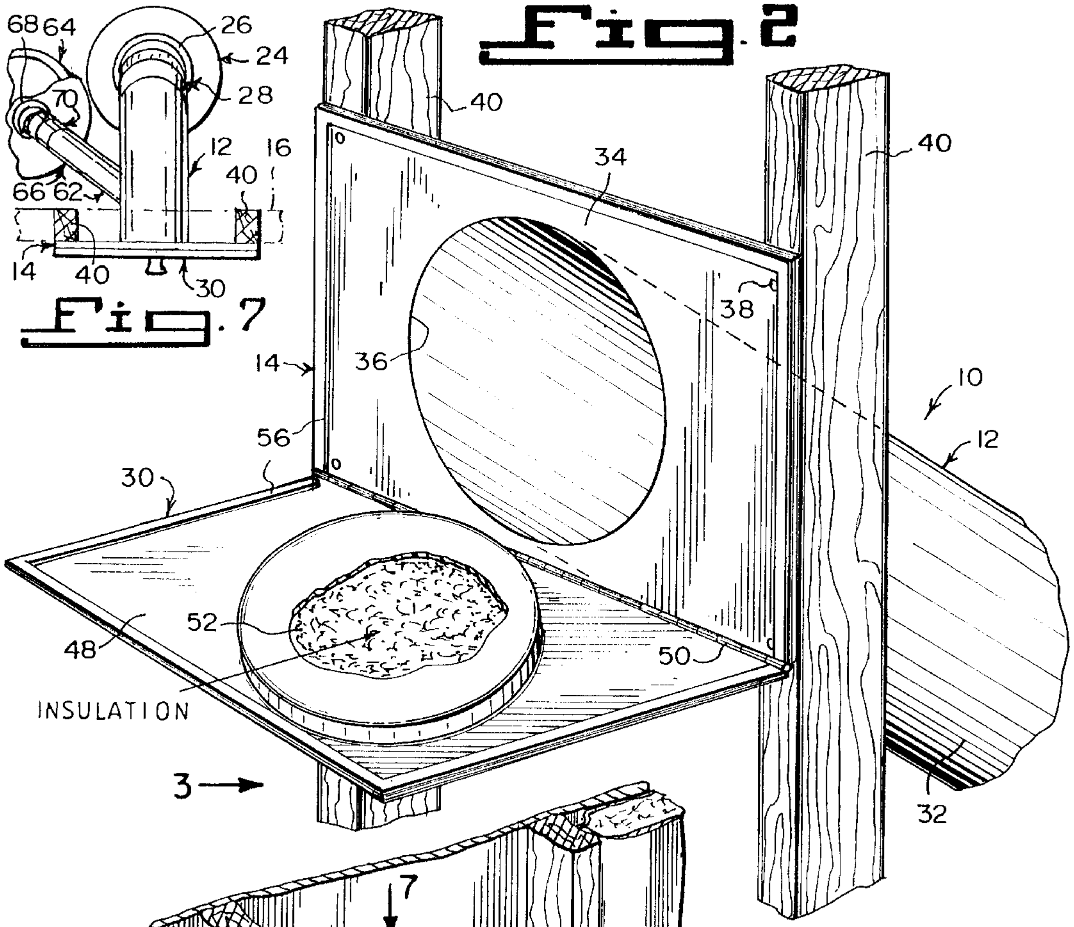
Fig. 7
Fig. 2
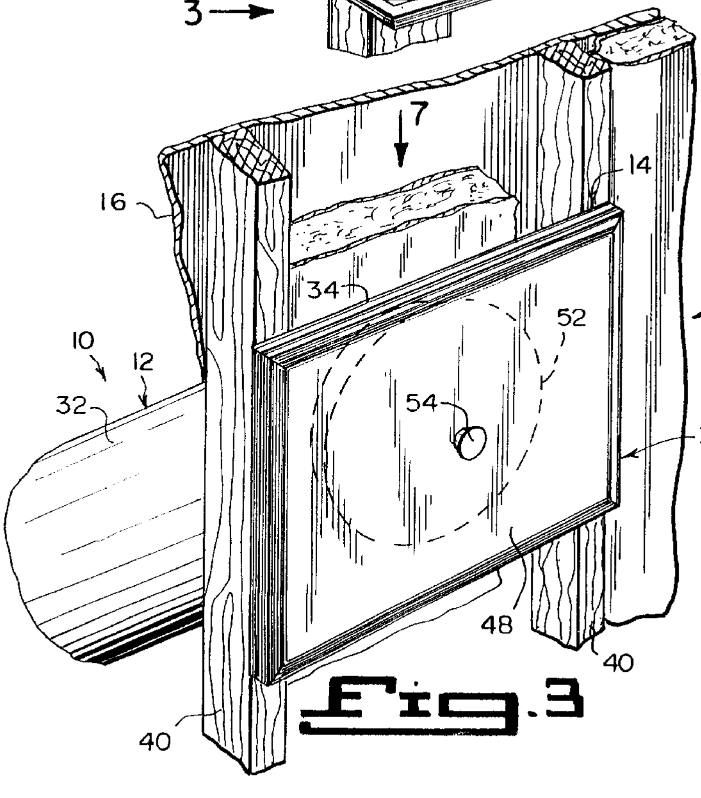
Fig. 3
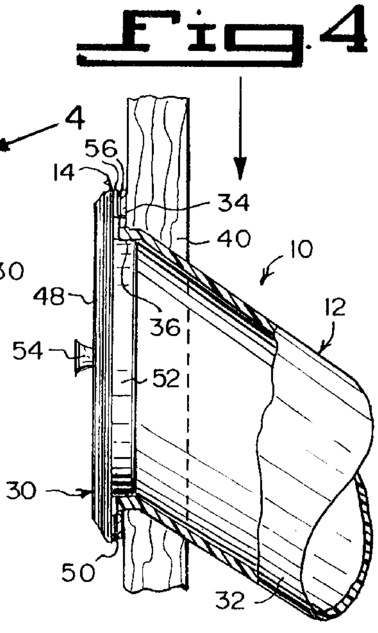
Fig. 4

RECYCLING DEVICE

BACKGROUND OF THE INVENTION

1. Field of the Invention

The instant invention relates generally to reprocessing systems and more specifically it relates to a recycling device.

2. Description of the Prior Art

Numerous reprocessing systems have been provided in prior art that are adapted to extract useful materials, such as plastic, glass and metal, so that the materials can be used again. While these units may be suitable for the particular purpose to which they address, they would not be as suitable for the purposes of the present invention as heretofore described.

SUMMARY OF THE INVENTION

A primary object of the present invention is to provide a recycling device that will overcome the shortcomings of the prior art devices.

Another object is to provide a recycling device that can be built into an exterior wall of a building, so that various useful materials can be transmitted and deposited directly into a container located outside of the building.

An additional object is to provide a recycling device that will allow more useable space within the building, since the separation of the useful materials is deposited into the container outside of the building.

A further object is to provide a recycling device that is simple and easy to use.

A still further object is to provide a recycling device that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views, and wherein;

FIG. 2 is an enlarged perspective view of an area indicated by arrow 2 in FIG. 1, with parts broken away.

FIG. 3 is a perspective view taken in the direction of arrow 3 in FIG. 2, with the door closed against the mounting plate.

FIG. 4 is a side view taken in the direction of arrow 4 in FIG. 3.

FIG. 7 is a diagrammatic top view of a second embodiment of the instant invention taken in the direction of arrow 7 in FIG. 3, showing a secondary smaller chute connected to the main chute for carrying aluminum cans into a second container.

Similar reference characters denote corresponding features consistently throughout the attached drawings.

DETAILED DESCRIPTION OF THE PREFERRED EMBODIMENTS

Figure 1:
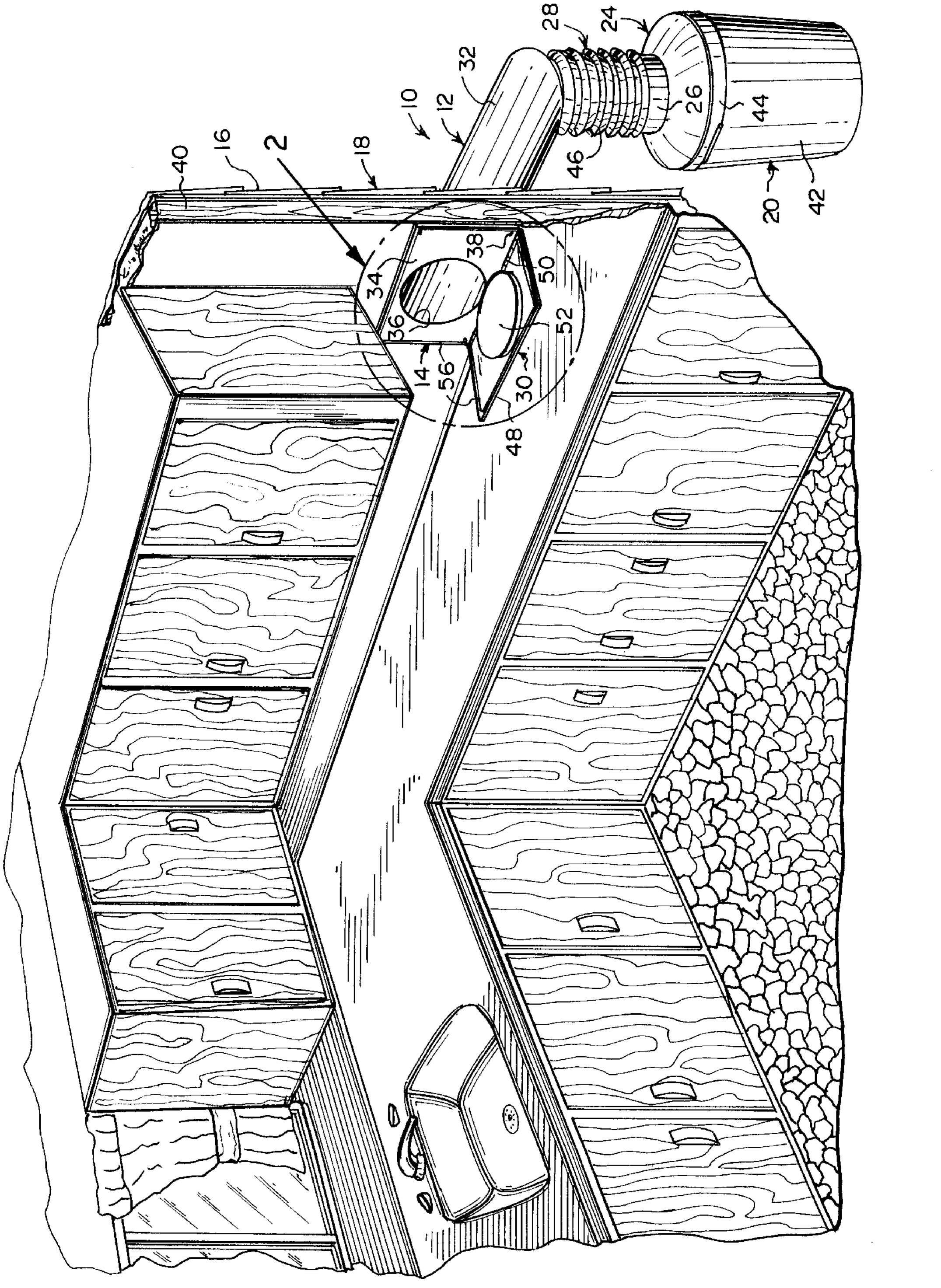
FIG. 1 is a perspective view of the interior of a portion of a building, such as the kitchen, with a first embodiment of the instant invention installed into an exterior wall.

Turning now descriptively to the drawings, in which similar reference characters denote similar elements throughout the several views, FIGS. 1 through 6 illustrate a recycling device 10 comprising a chute 12. A structure 14 is for mounting an upper end of the chute 12 through an exterior wall 16 of a building 18, so that the chute 12 will extend at an angle down and away from the exterior wall 16. A container 20 having an open top is provided. The container 20 is located on the ground 22 under a lower end of the chute 12 outside the exterior wall 16 of the building 18. A lid 24 is on the open top of the container 20. A collar 26 extends up from the center of the lid 24.

A flexible coupling member 28 is attached between the lower end of the chute 12 and the collar 26. The container 20 can receive useful recyclable materials that are inserted into the chute 12 from within the building 18. The flexible coupling member 28 will allow the lid 24 to be lifted off of the open top of the container 20, when the useful recyclable materials fill up the container 20.

As assembly 30 is for covering the mounting structure 14 when not in use, so as to seal off the mounting structure 14 from the interior of the building 18. The chute 12 is an elongated tube 32 sized to carry the useful recyclable materials therethrough.

The mounting structure 14 includes a rectangular plate 34 having an aperture 36 therethrough, in which the upper end of the chute 12 engages with the aperture 36. A plurality of fasteners 38 are for securing each corner of the plate between two wall studs 40 of the exterior wall 16.

The container 20 is a cylindrically tapered trash 42, in which the open top is slightly larger in diameter than the base of the trash can 42. The lid 24 includes a rim 44 thereabout, which fits over the open top of the container 20. The flexible coupling member 28 is a bellows type elbow fitting 46.

The covering assembly 30 consists of a door 48. A hinge 50 is between a bottom edge of the mounting structure 14 and the door 48. An insulation pad 52 on an interior face the door 48 seals the upper end of the chute 12, when the door 48 is closed. A doorknob 54 is on an exterior face of the door 48, so that a person can grasp the doorknob 54 to open and close the door 48. A pair of magnetic strip seals 56 are about the perimeter of the mounting structure 14 and the door 48. When the door 48 is closed, the magnetic strip seals 56 will keep the door 48 completely sealed against the mounting structure 14.

Figure 5:
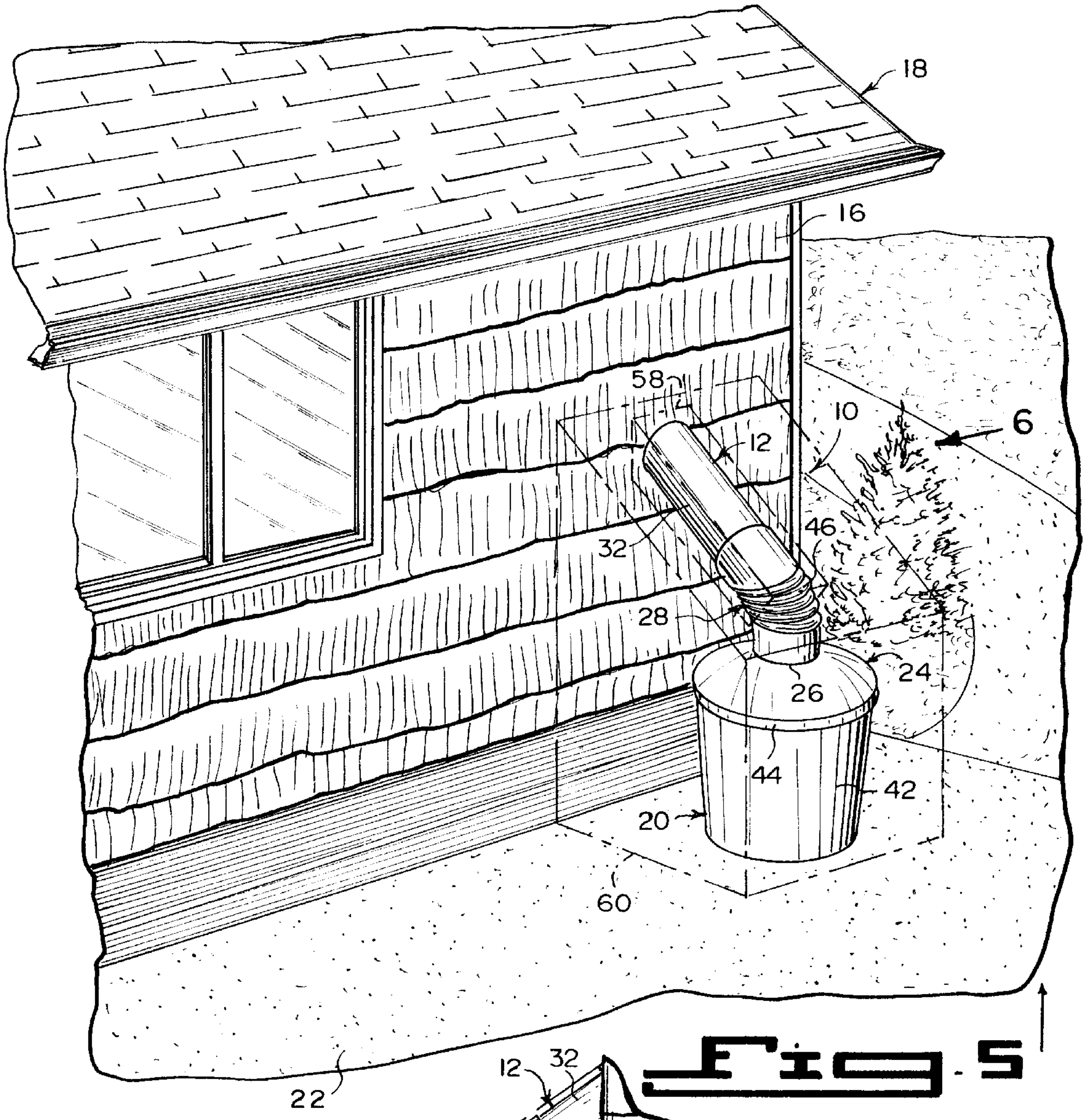
FIG. 5 is a perspective view of the exterior of a portion of the building, showing in phantom a sleeve covering the chute and a shed covering the chute, lid and container of the first embodiment.
Figure 6:
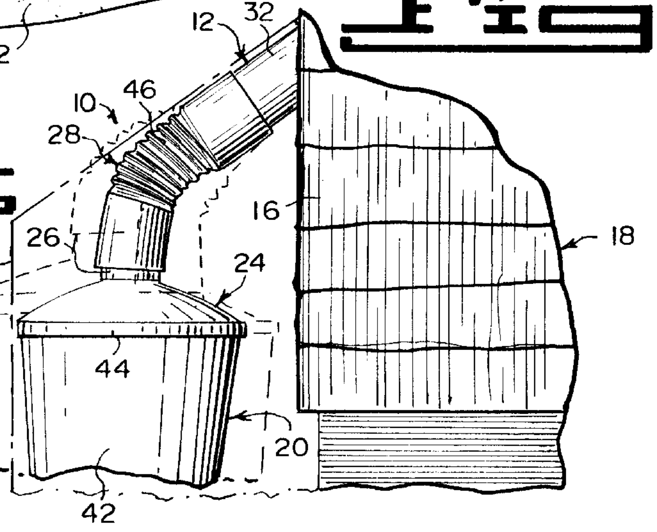
FIG. 6 is a side view taken in the direction of arrow 6 in FIG. 5, with parts broken away.

A sleeve 58, shown in phantom in FIG. 5, can fit over the chute 12. A shed 60, also shown in phantom in FIGS. 5 and 6, can extend over the chute 12, the lid 24, the collar 26, the flexible coupling 28 and the container 20 on the ground 22 against the exterior wall 16 of the building 18 for concealment thereof.

Figure 7A:
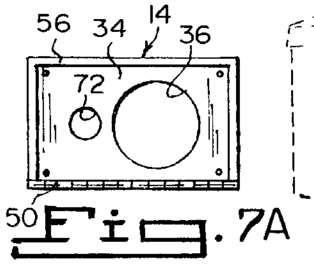
FIG. 7A is a front view of a modified mounting plate, showing an additional small aperture therethrough which connects to the secondary smaller chute, so that the aluminum cans can be inserted therein to be carried into the second container.

FIG. 7 shows a second chute 62 having an upper end attached into a side of the first chute 12 adjacent the mounting structure 14, so that the second chute 62 will extend at an angle down and away from the exterior wall 16 of the building 18. A second container 64 having an open top is also provided. The second container 64 is located on the ground 22 under a lower end of the second chute 62 outside the exterior wall 16 of the building 18. A second lid 66 is on the open top of the second container 64. A second collar 68 extends up from the center of the second lid 66.

It will be understood that each of the elements described above, or two or more together may also find a useful application in other types of methods differing from the type described above.

While certain novel features of this invention have been shown and described are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by letters patent is set forth in the appended claims:

1. A recycling device comprising:

a) a first chute;

b) means for mounting an upper end of said first chute through an exterior wall of a building, so that said first chute will extend at an angle down and away from the exterior wall;

c) a first container having an open top, said first container located on the ground under a lower end of said first chute outside the exterior wall of the building;

d) a first lid on the open top of said container;

e) a first collar extending up from said first lid;

f) a first flexible coupling member attached between the lower end of said first chute and said first collar, so that said first container can receive useful recyclable materials that are inserted into said first chute from within the building and said first flexible coupling member will allow said first lid to be lifted off of the open top of said first container, when the useful recyclable materials fill up said first container;

g) a second chute having an upper end attached into a side of said first chute adjacent said mounting means, so that said second chute will extend at an angle down and away from the exterior wall of the building:

h) a second container having an open top; said second container located on the ground under a lower end of said second chute outside the exterior wall of the building;

i) a second lid on the open top of said second container;

j) a second collar extending up from said second lid; and k) a second flexible coupling member attached between the lower end of said second chute and said second collar, so that said second container can receive useful recyclable materials that are inserted into said second chute from within the building and said second flexible coupling member will allow said second lid to be lifted off of the open top of said second container, when the useful recyclable materials fill up said second container.

2. A recycling device as recited in claim 1, further including means for covering said mounting means when not in use, so as to seal off said means for mounting from the interior of the building.

3. A recycling device as recited in claim 1, wherein each said chute is an elongated tube sized to carry the useful recyclable materials therethrough.

4. A recycling device as recited in claim 1, wherein said mounting means includes:

a) a rectangular plate having an aperture therethrough, in which the upper end of said first chute engages with said aperture; and b) a plurality of fasteners for securing each corner of said plate between two wall studs of the exterior wall.

5. A recycling device as recited in claim 1, wherein each said container is a cylindrically tapered trash can, in which the open top is slightly larger in diameter than a base of said trash can.

6. A recycling device as recited in claim 1, wherein each said lid includes a rim thereabout, which fits over the open top of said container.

7. A recycling device as recited in claim 1, wherein each said flexible coupling member is a bellows type elbow fitting.

8. A recycling device as recited in claim 1, further including:

a) a sleeve to fit over each said chute; and b) a shed to extend over each said chute, said lid, said collar, said flexible coupling and said container on the ground against the exterior wall of the building for concealment thereof.

9. A recycling device comprising:

a) a chute;

b) means for mounting an upper end of said chute through an exterior wall of a building, so that said chute will extend at an angle down and away from the exterior wall;

c) a container having an open top, said container located on the ground under a lower end of said chute outside the exterior wall of the building;

d) a lid on the open top of said container;

e) a collar extending up from said lid;

f) a flexible coupling member attached between the lower end of said chute and said collar, so that said container can receive useful recyclable materials that are inserted into said chute from within the building and said flexible coupling member will allow said lid to be lifted off of the open top of said container, when the useful recyclable materials fill up said container; and g) means for covering said means for mounting when not in use, so as to seal off said means for mounting from the interior of the building, wherein said covering means includes:

i) a door;

ii) a hinge between a bottom edge of said means for mounting and said door;

iii) an insulation pad on an interior face of said door to seal the upper end of said chute, when said door is closed;

iv) a doorknob on an exterior face of said door, so that a person can grasp said doorknob to open and close said door; and v) a pair of magnetic strip seals about the perimeter of said means for mounting and said door, so that when said door is closed said magnetic strip seals will keep said door completely sealed against said means for mounting.

10. A recycling device comprising:

a) a first chute and a second chute;

b) means for mounting upper ends of said first and second chutes through an exterior wall of a building so that said first and second chutes will extend at an angle down and away from the exterior wall, said means for mounting including;

i) a rectangular plate having a plurality of apertures therethrough, in which the upper ends of said first and second chutes engage with said apertures; and ii) a plurality of fasteners for securing said plate to the exterior wall;

c) first and second containers, each having an open top, said first container located on the ground under a lower end of said first chute outside the exterior wall of the building, and said second container located on the ground under a lower end of said second chute outside the exterior wall of the building;

d) a first lid on the open top side of said first container, and a second lid on the open top side of said second container;

e) a first collar extending up from said first lid, and a second collar extending up from said second lid;

f) a first flexible coupling member attached between the lower end of said first chute and said first collar, and a second flexible coupling member attached between the lower end of said second chute and said second collar, so that said containers can receive useful recyclable materials that are inserted into said chutes from within the building and said flexible coupling members will allow said lids to be lifted off of the open tops of said containers, when the useful recyclable materials fill up said containers, wherein each of said first and second chutes is an elongated tube sized to cam the useful recyclable materials therethrough.

11. A recycling device as recited in claim 10, wherein each said container is a cylindrically tapered trash can, in which the open top is slightly larger in diameter than a base of said trash can.

12. A recycling device as recited in claim 11, wherein each said lid includes a rim thereabout, which fits over the open top of said container.

13. A recycling device as recited in claim 12, wherein each said flexible coupling member is a bellows type elbow fitting.

14. A recycling device as recited in claim 13, further means for covering said mounting means when not in use, so as to seal off said mounting means from the interior of the building, wherein said covering means includes:

a) a door;

b) a hinge between a bottom edge of said mounting means and said door;

c) an insulation pad on an interior face of said door to seal the upper end of said chute, when said door is closed;

d) a doorknob on an exterior face of said door, so that a person can grasp said doorknob to open and close said door; and e) a pair of magnetic strip seals about the perimeter of said mounting means and said door, so that when said door is closed said magnetic strip seals will keep said door completely sealed against said mounting means.

15. A recycling device as recited in claim 14, further including:

a) a sleeve to fit over each said chute; and b) a shed to extend over each said chute, said lid, said collar, said flexible coupling and said container on the ground against the exterior wall of the building for concealment thereof.

* * * * *